(12) United States Patent
Magill

(10) Patent No.: US 10,884,149 B2
(45) Date of Patent: Jan. 5, 2021

(54) SYSTEM AND METHOD FOR ASSESSING THE PRESENCE OF HYDROCARBONS IN A SUBTERRANEAN RESERVOIR BASED ON SEISMIC DATA

(71) Applicant: CHEVRON U.S.A. INC., San Ramon, CA (US)

(72) Inventor: James R. Magill, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 275 days.

(21) Appl. No.: 15/973,621

(22) Filed: May 8, 2018

(65) Prior Publication Data
US 2018/0329096 A1 Nov. 15, 2018

Related U.S. Application Data

(60) Provisional application No. 62/503,663, filed on May 9, 2017.

(51) Int. Cl.
| | |
|---|---|
| *G01V 1/30* | (2006.01) |
| *G01V 1/28* | (2006.01) |
| *G01V 1/34* | (2006.01) |

(52) U.S. Cl.
CPC .............. *G01V 1/307* (2013.01); *G01V 1/282* (2013.01); *G01V 1/34* (2013.01); *G01V 2210/624* (2013.01); *G01V 2210/632* (2013.01)

(58) Field of Classification Search
CPC ..................................................... G01V 1/307
USPC ......................................................... 702/14
See application file for complete search history.

(56) References Cited

U.S. PATENT DOCUMENTS

| | | | |
|---|---|---|---|
| 5,862,100 A | 1/1999 | Verwest | |
| 8,553,499 B2* | 10/2013 | Albertin | G01V 1/28 367/38 |
| 8,649,980 B2* | 2/2014 | Gulati | G01V 1/28 702/11 |
| 2005/0007876 A1 | 1/2005 | Castagna et al. | |
| 2007/0203673 A1 | 8/2007 | Sherrill et al. | |
| 2009/0192718 A1 | 7/2009 | Zhang et al. | |
| 2011/0172977 A1 | 7/2011 | Kolbjoernsen et al. | |
| 2015/0073715 A1* | 3/2015 | Aarre | G01V 1/345 702/14 |
| 2015/0355353 A1* | 12/2015 | Whitaker | G01V 1/345 702/14 |

(Continued)

OTHER PUBLICATIONS

Houck R. T., et al. "Quantifying the uncertainty in an AVO interpretation", Geophysics, Society of Exploration Geophysicists, Feb. 1, 2002, vol. 67, No. 1, pp. 117-125.

(Continued)

*Primary Examiner* — Ricky Ngon
(74) *Attorney, Agent, or Firm* — Marie L. Clapp

(57) ABSTRACT

A method is described for a manner of geologic analysis using seismic data. The method includes steps to produce improved amplitude versus angle (AVA) information that may be used for analysis of geologic features of interest including estimation of pore fluid content. The method assesses the probability of hydrocarbons in a subterranean reservoir based on seismic amplitude variations along offsets or angles for portions of a seismic horizon. The method may be executed by a computer system.

6 Claims, 15 Drawing Sheets

(56) References Cited

U.S. PATENT DOCUMENTS

2015/0362623 A1* 12/2015 Miotti .................. G01V 11/00
702/14
2017/0199289 A1* 7/2017 Peng ...................... G01V 1/375

OTHER PUBLICATIONS

Thompson, P., et al. "Distinguishing gas san from shale/brine sand using elastic impedance data and the determination of the lateral extent of channel reservoirs using amplitude data for a channelized deepwater gas field in Indonesia" The Leading Edge, Society of Exploration Geophysicists, Mar. 1, 2009, pp. 312-317.

PCT Notification of Transmittal of the International Search Report and the Written Opinion of the International Searching Authority, or the Declaration, dated Jun. 5, 2015, 11 pages.

PCT International Preliminary Report on Patentability, International Application No. PCT/US2015/016828, dated Nov. 17, 2016.

Ross C.P et al., "Effective Avo Crossplot Modeling: A Tutorial", Geophysics, Society of Exploration Geophysicists, May 1, 2000, pp. 700-711, vol. 65—No. 3, XP000967898.

Sabry Lotfy Mahmoud et al., "Fluid Discrimination Applying AVA Potentiality for Carbonate Reservoir in UAE", International Petroleum Technology Conference, Dec. 9, 2009, pp. 1-10, XP055495926.

PCT International Search Report and Written Opinion, dated Aug. 6, 2018, issued in International Application No. PCT/IB2018/053185, filed on May 8, 2018, 15 pages.

PCT International Search Report and Written Opinion, dated Aug. 6, 2018, issued in International Application No. PCT/IB2018/053186, filed on May 8, 2018, 13 pages.

* cited by examiner

SYSTEM AND METHOD FOR ASSESSING THE PRESENCE OF HYDROCARBONS IN A SUBTERRANEAN RESERVOIR BASED ON SEISMIC DATA

CROSS-REFERENCE TO RELATED APPLICATIONS

This application claims the benefit of U.S. Provisional Patent Application 62/503,663 filed May 9, 2017.

STATEMENT REGARDING FEDERALLY SPONSORED RESEARCH OR DEVELOPMENT

Not applicable.

TECHNICAL FIELD

The present disclosure relates generally to methods and systems for probabilistic analysis of geologic features using seismic data and, in particular, methods and systems for assessing the probability of hydrocarbons in a subterranean reservoir based on seismic amplitude variations along offsets or angles for portions of a seismic horizon.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

In some cases, it is desirable to analyze the recorded seismic amplitudes. This may be done in many ways. One step in conventional processing of seismic reflection data involves adding multiple seismic traces that share a common mid-point, but have different source-receiver offsets. This is commonly called "stacking". Stacking generally improves the signal to noise ratio, but can result in ambiguity surrounding the cause of the seismic amplitudes. For example, a high seismic amplitude could indicate either the presence of fluids or the presence of a particular lithology.

One conventional technique that can provide an improved method of delineating between lithology and fluids is employment of amplitude versus offset (AVO) or angle (AVA) for a representative offset/angle gather. Those of skill in the art would be aware that amplitude versus angle (AVA) is often used interchangeably with amplitude versus offset (AVO).

During processing, this type of AVA data may not be stacked thereby to preserve information that can be used to distinguish indicators of fluids from indicators of lithology. For example, considering a seismic trace, in one scenario, a hydrocarbon-bearing sand may generally have an increasingly negative seismic amplitude at further source-receiver offsets compared to a water-bearing sand which may be indicated by a decrease in positive seismic amplitude at further source-receiver offsets.

The above methods may however often be biased and may not truly represent the geologic features. In addition, conventional methods may fail where seismic data quality is low, such as where random and/or coherent noise is prevalent, or where seismic gathers are not flat. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries and fluid content within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for seismic processing methods capable of producing improved AVA information that may be used for analysis of geologic features of interest.

SUMMARY

In accordance with some embodiments, a method of determining a best-case fluid estimation for a subterranean reservoir including receiving a digital seismic image representative of a subsurface volume of interest and a range of geological and geophysical parameters possible in the subsurface volume of interest; identifying at least one spatial area of interest representative of a brine-filled reservoir formation; calculating measured seismic amplitude versus angle (AVA) responses from the digital seismic image in each of the at least one spatial areas; calculating statistical data ranges of the measured seismic AVA responses based on the measured AVA responses; forward modeling all combinations of the geological and geophysical parameters assuming a brine saturation to generate a set of synthetic seismic brine AVA responses; performing forward modeling of the combinations of geological and geophysical parameters wherein the forward modeling uses hydrocarbon saturation rather than brine; and determining a best-case fluid estimation probability based on the forward modeling of the combinations of geological and geophysical parameters is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
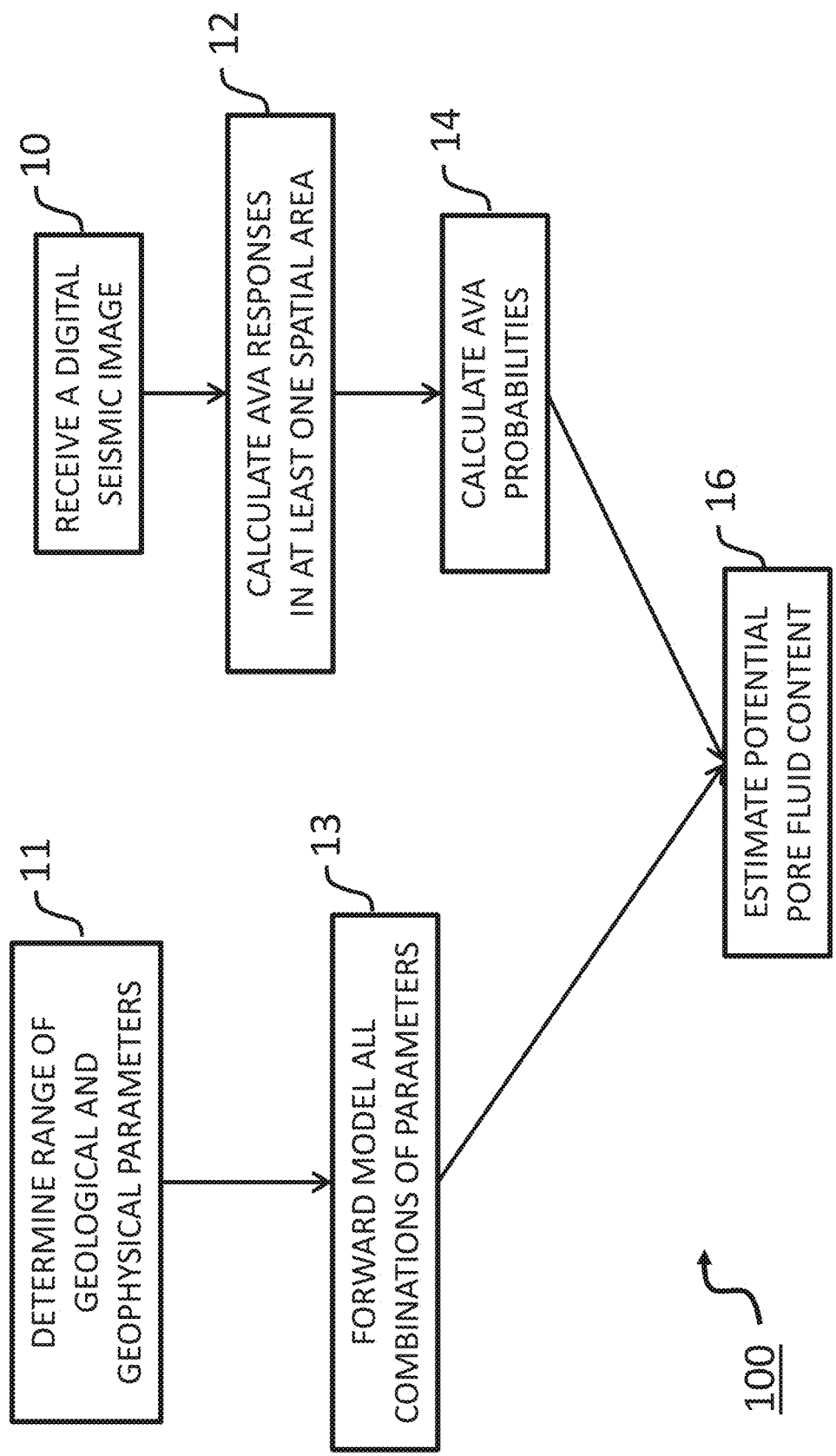
FIG. 1 illustrates a flowchart of a method of analyzing geologic features using seismic data, in accordance with some embodiments.

Described below are methods, systems, and computer readable storage media that provide a manner of geologic analysis using seismic data. These embodiments are designed to calculate probabilities of hydrocarbons (i.e. fluid property estimation) in subsurface geologic features. Industry standard techniques use deterministic estimation of the underlying geologic and geophysical parameters which contribute to the amplitude versus angle response utilizing forward modeling or inversion. The subsurface parameters of interest are the thickness, pore fluid (brine, oil, gas), hydrocarbon saturation, porosity, etc. The present method combines probabilistic AVA/AVO (amplitude versus angle/amplitude versus offset) and spatial summation of amplitude versus offset gathers with a Bayesian analysis to determine the range of geologic and geophysical parameters that will fit a user-selected range of measured field responses with selected areas. The probabilistic estimation builds a model space with a regular grid, then a singular bin is located for a given seismic trace and the property estimation is based on counting models in that singular bin. The range of possible models can be selected as either those models where the downdip responses fit a brine-filled reservoir and the updip responses fit a fluid-filled reservoir (the fluid being brine, oil, or gas), or those models where the updip responses fit a fluid-filled reservoir (with no accounting for the downdip response), or both. The present invention allows boxes based on the seismic data to be defined in the model space based on the probabilistic analysis from which the property estimation is done by counting models in the boxes.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. The seismic dataset may be processed and imaged via a pre-stack method in order to analyze the seismic amplitude versus angle (AVA) or offset (AVO).

The present invention includes embodiments of a method and system for assessing rock properties in a subterranean reservoir to determine the probability of hydrocarbons. Rock properties may include at least one of pore fluid content, porosity, brine composition, hydrocarbon composition, pressure, temperature, porosity, reservoir thickness, mineralogical composition (e.g. $V_{Shale}$), or any combination thereof. The typical goal of fluid estimation is to distinguish gas from water or oil from water generally depending on the type of hydrocarbons that are associated with a given basin. In a gas prone basin, distinguishing gas sand from wet sand is the primary goal. Low saturation gas (e.g. Sg (gas saturation) of 10%; fizz) is a secondary concern and can be included to estimate probabilities for three fluids: gas, low saturation gas (fizz) and wet (also called wet or brine). For an oil prone basin, distinguishing oil sand from wet sand is the primary goal. Basins with intermediate cases are quite common, meaning basins associated with both oil and gas. In such cases, distinguishing between gas sand, oil sand and wet sand is the goal and so it is desirable to estimate fluid probabilities for three fluids: gas, oil and wet. The two general cases for fluid estimation are:
1) Gas, oil, and wet
2) Gas, low saturation gas (fizz) and wet There are obvious exceptions to the above, 4D seismic and CO2 injection being the two such cases. For these exceptions, the target is to estimate the composition of the pore space fluids generally in terms of partial saturation, where the saturation may be water, oil or gas. A specific embodiment may focus on a business case trying to distinguish gas, low saturation gas (fizz) and wet. Alternative cases (oil or various saturations) are equally valid. Determining the most probable rock properties in a geologic feature and a range of possible rock properties allows strategic planning around budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment, as well as ultimately drilling into an optimum location to produce the hydrocarbons.

FIG. 1 illustrates a flowchart of a method 100 for geologic analysis of a subsurface volume of interest. At operation 10, a digital seismic image is received. As previously described, a seismic dataset includes a plurality of traces recorded at a plurality of seismic sensors. This dataset may have already been subjected to a number of seismic processing steps, such as deghosting, multiple removal, spectral shaping, and the like, before undergoing a seismic imaging process. These examples are not meant to be limiting. Those of skill in the art will appreciate that there are a number of useful seismic processing steps that may be applied to seismic data and seismic images. The digital seismic image received 10 may be, for example, a pre-stack seismic image, one or more seismic angle stacks, or one or more digital seismic horizon amplitude maps. The seismic horizon amplitude maps may have been computed at a series of angles (or summation of adjacent angles) in place of migrated seismic gathers. The seismic amplitude maps are computed by extracting the seismic amplitude from the migrated seismic gathers (either exact amplitude, or a computation of seismic amplitude at times around the horizon computed as average, absolute, rms, maximum, minimum, or other computational method) at the interpreted horizon time.

At operation 12, the seismic amplitude versus angle (AVA) responses are calculated in at least one spatial area identified in the seismic image on at least one seismic horizon. This may be done, for example, using the method of US 2016/0209531, System and Method for Analyzing Geologic Features Using Seismic Data, which is incorporated herein in its entirety. A pre-stack seismic image contains multiple seismic horizons that represent seismic events identified or selected, in an embodiment, by a user as being of interest. These seismic horizons may represent a single thin lithology, such as a sand layer or a shale layer, or an interface within one or between two or more lithologies. If seismic horizon amplitude maps were received at operation 10, the seismic horizon(s) of interest are already identified.

The seismic horizons may be represented in time or depth, being optionally flattened on one or more of the horizons. As is known, flattening of seismic data is used to remove the influence of geological processes such as folding and faulting in one or more the lithological interfaces from the data, enabling images produced from the seismic data to be processed into horizontal layers, e.g., for easier interpretation. The flattening of seismic data is an optional step.

The seismic image and seismic horizons received may be two-dimensional (2-D) (e.g., a horizontal dimension "x" and a time or depth dimension "z") or three-dimensional (3-D) data sets (e.g., two perpendicular horizontal dimensions "x" and "y" and a time or depth dimension "z").

In an embodiment, two or more areas of interest are identified on the seismic horizons. In an embodiment using 3-D data, the areas of interest may be identified on a map view of the one or more seismic horizons, e.g., as polygons, wherein the map view may be colored (or shaded or contoured) to indicate the seismic amplitudes along the particular horizon.

Figure 2:
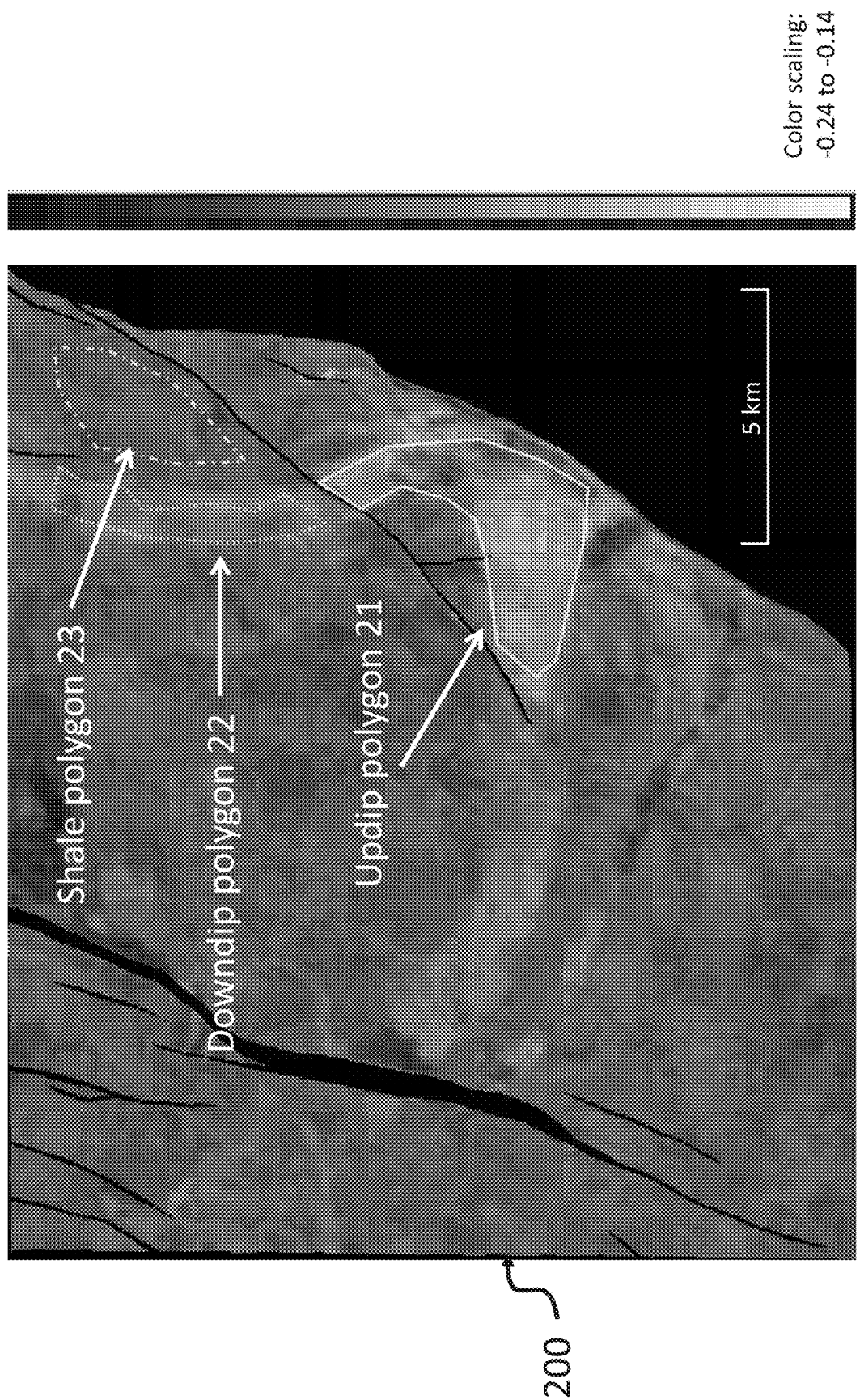
FIG. 2 is an example of one step from an embodiment.

One example of a map view of a seismic horizon, including a seismic amplitude legend to the side thereof, is shown in FIG. 2. To create this map view 200, a full range of seismic amplitude data has been stacked, which in this example embodiment is seismic amplitude data between angles 4° and 60°, as part of a data preprocessing step. The map indicates different regions of varying seismic amplitudes (indicated in differing shades) mostly correlating with the distribution of lithology, as well as liquids and gas, e.g., hydrocarbons. These differences in seismic amplitude across the chosen angle range are used to delineate the specific areas of interest. The areas of interest may be selected through analysis of the data or may be received as inputs from the user.

In this example of FIG. 2, an updip polygon is chosen in an area of general negative seismic amplitude, see reference numeral 21, and may, e.g., represent the crest of an upwardly slanting layer of rock, i.e., the pinnacle of an anticline (or updip). This indicates, in this particular example, a location where gas or oil are most likely to be found.

Usually and if present, oil or water would occur in a downdip downslope from the updip polygon 21. In the particular example of FIG. 2, a downdip polygon 22 is therefore chosen in an area with a seismic amplitude generally higher (i.e. less negative) than that of the updip area 21.

As is evident from FIG. 2, a shale polygon 23 may also optionally be chosen in an area with a seismic amplitude generally lower in absolute amplitude than both the updip and downdip polygons 21, 22. It may be necessary to take additional information relating to a trend of the dip into account when choosing a particular polygon, e.g., the shale polygon 23 may be chosen furthest away from the updip polygon 21.

It would be appreciated by a person skilled in the art that this example is not meant to be limiting and that other seismic amplitude variations may correspond to different structural configurations and locations of gas, oil, or water. For example, in other embodiments, the updip polygon representing a location where gas or oil are located may be chosen in an area of positive (and high) seismic amplitude, while the downdip polygon representing locations of oil or water may be chosen in an area of negative (and low) seismic amplitude. Although the terms "updip" and "downdip" are used herein to identify and differentiate between the polygons containing the spatial areas of interest, this example is likewise not meant to be limiting. In some embodiments, the polygons are intended to identify at least two areas that are suspected to have different fluid contents but the actual structural relationship may vary. By way of example and not limitation, the structural relationship may be two areas separated by a fault.

In some embodiments, each area of interest may encase a large number of seismic trace locations. In terms of the present disclosure, it is important to include a sufficient number of seismic trace locations (resulting in a sufficient number of seismic traces or data sets to be processed) thereby to ensure statistical stability of the resulting AVA curves. By way of example and not limitation, a sufficient number of seismic trace locations may be on the order of thousands of trace locations.

The statistical data ranges are influenced and determined by a range of geology enclosed in the selected area of interest (i.e. polygon) and noise. The range of geology may include, for example, changes in thickness, porosity, grain size, cementation, mineralogical composition, or the like. Statistical stability of the data is ensured by making the area of interest (polygon) sufficiently large to ensure that the noise is averaged out, as well as large enough to contain a representative sampling of the geology.

Referring again to FIG. 1, in operation 14 statistical data ranges are computed for the seismic amplitudes in each of the areas of interest, shown in the example of FIG. 2 as updip, downdip and shale polygon 21, 22 and 23. These computations and calculations may be performed by reading seismic angle gathers, i.e. all of the seismic traces at a particular angle for an area of interest, identifying a time gate centered on the seismic horizon, and computing the aggregated amplitudes at each angle. The time gate has the effect of isolating a portion of each selected trace around a feature of interest in time. This process of computing the statistical data ranges for the seismic amplitudes in each of the areas of interest is computationally expensive.

A person skilled in the art would appreciate that the computation and calculations of statistical data ranges can be performed using pre-stack seismic data in depth coordinates, rather than time coordinates, and identifying a depth gate centered on the seismic horizon.

Figure 3:
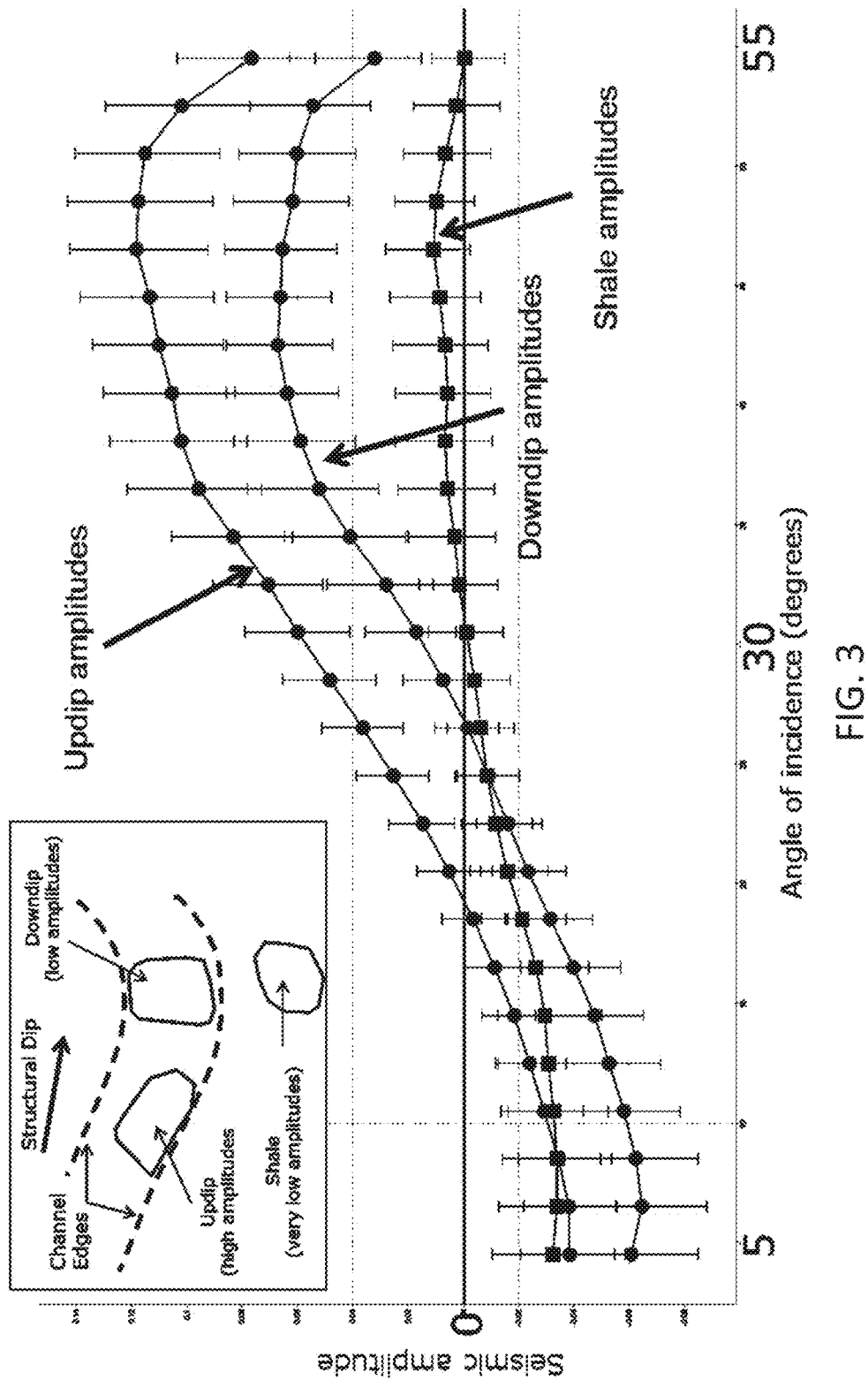
FIGS. 3-7 are examples of other steps from various embodiments.

In terms of the present method it is advantageous to calculate the probability of various seismic amplitudes within the area of interest, thereby allowing the statistical data ranges of seismic amplitudes to be determined. In some embodiments, the statistical data ranges may be represented by P50 and an upper and a lower probabilistic value for seismic amplitudes, each of the upper and lower values being similarly offset from the P50 value. For example, the upper and lower probabilistic values may respectively be selected as a P10 and a P90 probabilistic value, a P20 and a P80 probabilistic value, a P30 and a P70 probabilistic value, or the like. These values are provided by way of example only and are not meant to be limiting. FIG. 3 shows an example of P50 curves calculated for an updip, downdip, and shale polygon with P20-P80 range bars.

Typically, the P50 probabilistic value represents the underlying signal, while the upper and lower probabilistic values are indicative of a probabilistic range which represents the variable geology and/or noise. A variety of statistics may be computed from the aggregated seismic amplitudes, i.e. in addition, or alternatively, to the probabilistic values mentioned above. For example, the statistical data ranges may include one or more of an average or mean (such as an average absolute amplitude), a mode, or a standard deviation such as RMS amplitude. It will be appreciated that other statistical measures may also be used. The use of many seismic trace locations from the areas of interest may assist in obtaining statistically significant data, in that the data may be more stable and distinct.

In addition, in another embodiment, narrow angle stacks may be created by summing the seismic traces for each time or depth sample at two or more angles, e.g., adjacent angles (such as 1-2°, 2-3°, 3-4°, etc). A normalization based on the number of traces summed may be used in order to obtain an optimum presentation of the results. In other words, these narrow angle stacks may in some instances stabilize the trend of the AVA curves produced. It will however be appreciated that in many cases there may be no need for this type of stacking. As an alternative to using the AVA responses at particular angles or angle stacks, the statistical data ranges may be based on other criteria such as the gradient or rate of change of the seismic amplitude response with angle or other industry-recognized measurements in the field (e.g., fanfar, grenv).

Referring again to FIG. 1, at operation 11 the method 100 determines possible ranges of geological and geophysical parameters expected in the reservoir zone being analyzed that affect the seismic amplitude versus angle response. The expected ranges of geological and geophysical parameters are determined by the user based on nearby known information (e.g., previously drilled wells), estimated from theoretical equations, or other such information sources to provide results which may best characterize the expected geological and geophysical parameters expected in the reservoir zone. These parameters may include brine composition, hydrocarbon composition, pressure, temperature, porosity, reservoir thickness, mineralogical composition, and other factors. These determinations may be done by regional analysis, geologic inference or analogs, petrophysical analysis from analog well logs, or other means. Those of skill in the art will be aware that there are a number of ways of determining reasonable ranges of geological and geophysical parameters for a particular subterranean volume.

Geological parameters may be determined, for example, for a situation in which there is advance knowledge of the deposition environment of the material. In this case, that knowledge may allow the user to determine information regarding what types of materials are likely to be present as well as what relationship various layers are likely to have. By way of example, an eolian deposition environment would tend to include sandstones that are relatively free of clay and relatively well-sorted. In contrast, deltaic sandstones would tend to be higher in clay content. In order to render the hypothetical physical properties more relevant to the analysis of the acquired seismic data, the types of sandstone generated would depend, at least in part, on whether the region under investigation includes wind-deposited or river delta deposited material and could be further differentiated based on specifics of the deposition environment. Geophysical parameters may be determined, for example, where there is local information available, such as from well cores or well logs from nearby wells.

Once the ranges of possible geological and geophysical parameters are determined, operation 13 proceeds to perform a full range of 2-layer or 3-layer forward modeling with all combinations of the geological and geophysical parameters. This may be done, for example, using a method such as that described in U.S. Pat. No. 7,869,955, Subsurface Prediction Method and System, which is incorporated herein in its entirety. By way of example and not limitation, pseudo-wells including multiple types of synthetic well logs may be generated. Pseudo-wells may include physical properties such as Vp, Vs, density, porosity, shale volume (Vshale), saturation, pore fluid type or other properties.

The pseudo-wells may be generated using a partially random approach. Rather than using a simple stochastic approach, in which any particular physical model is equally likely, the generation of the pseudo-wells may be constrained by physical constraints. The constraining may take place prior to the generating, or alternately, purely stochastic pseudo-wells may be later constrained (e.g., by eliminating wells having characteristics outside the constraints). As will be appreciated, it is likely to be more efficient to first constrain, then generate, the wells, but either approach should be considered to be within the scope of the present invention.

Figure 4:
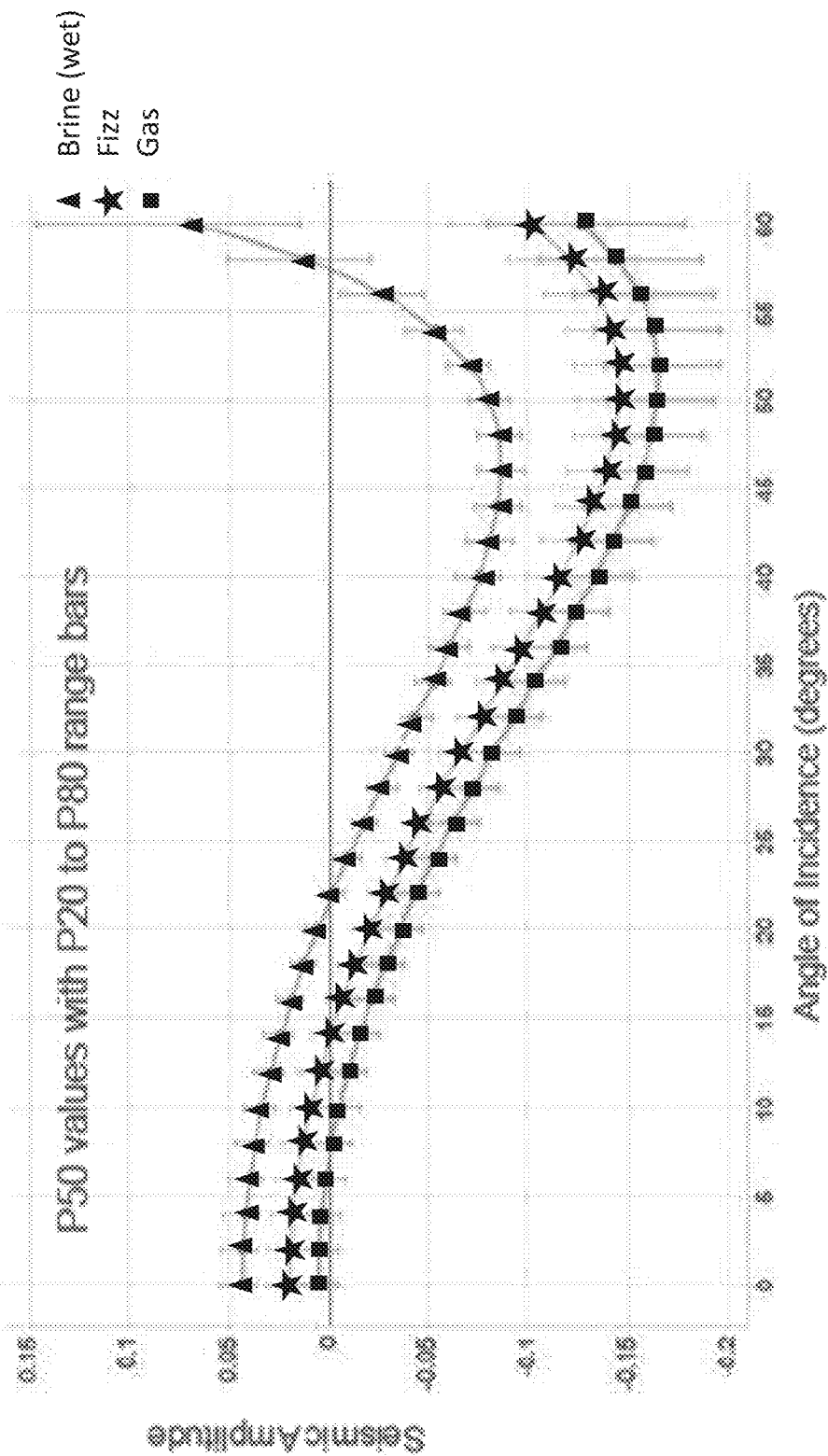
Figure 5:
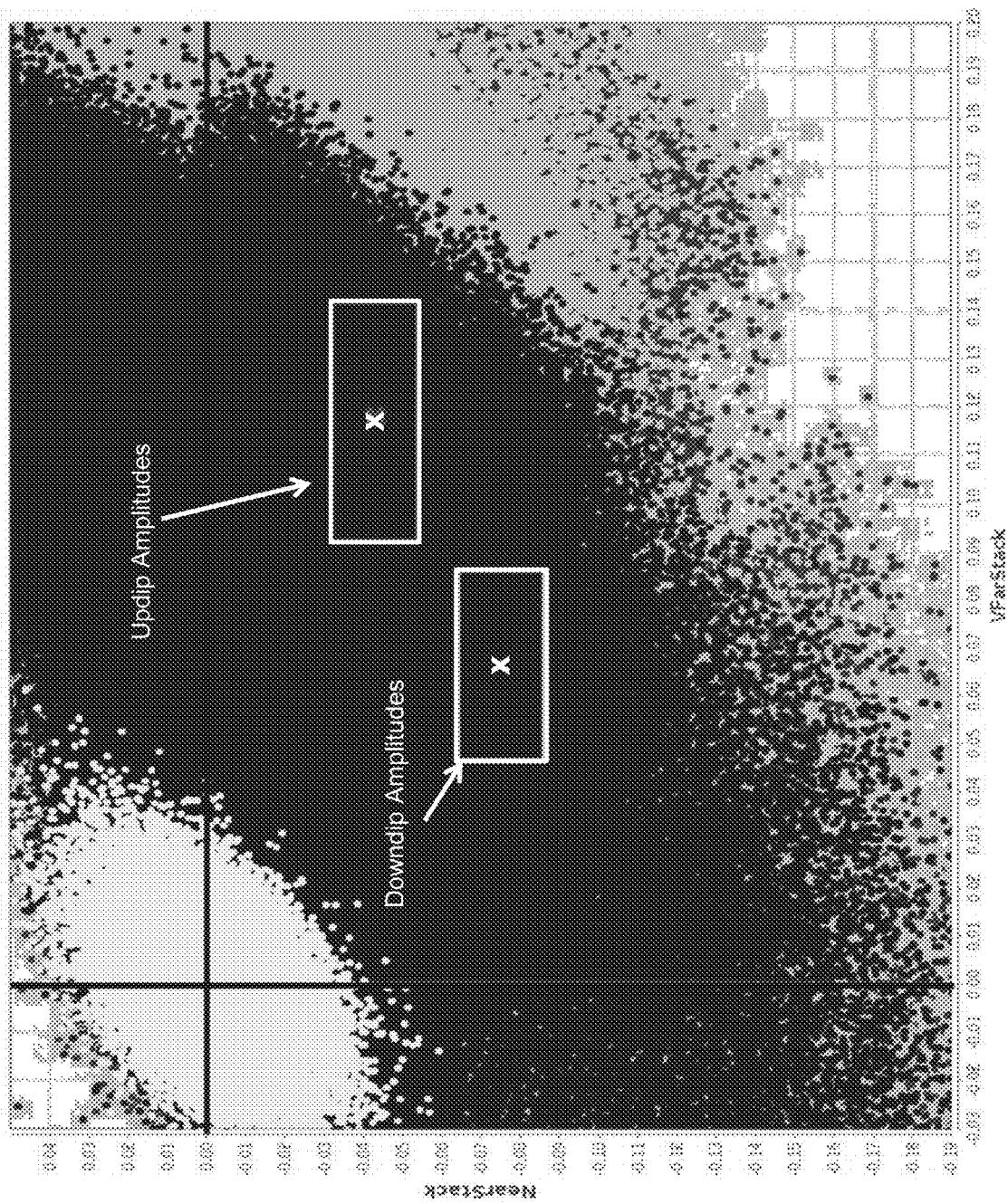
Figure 6:
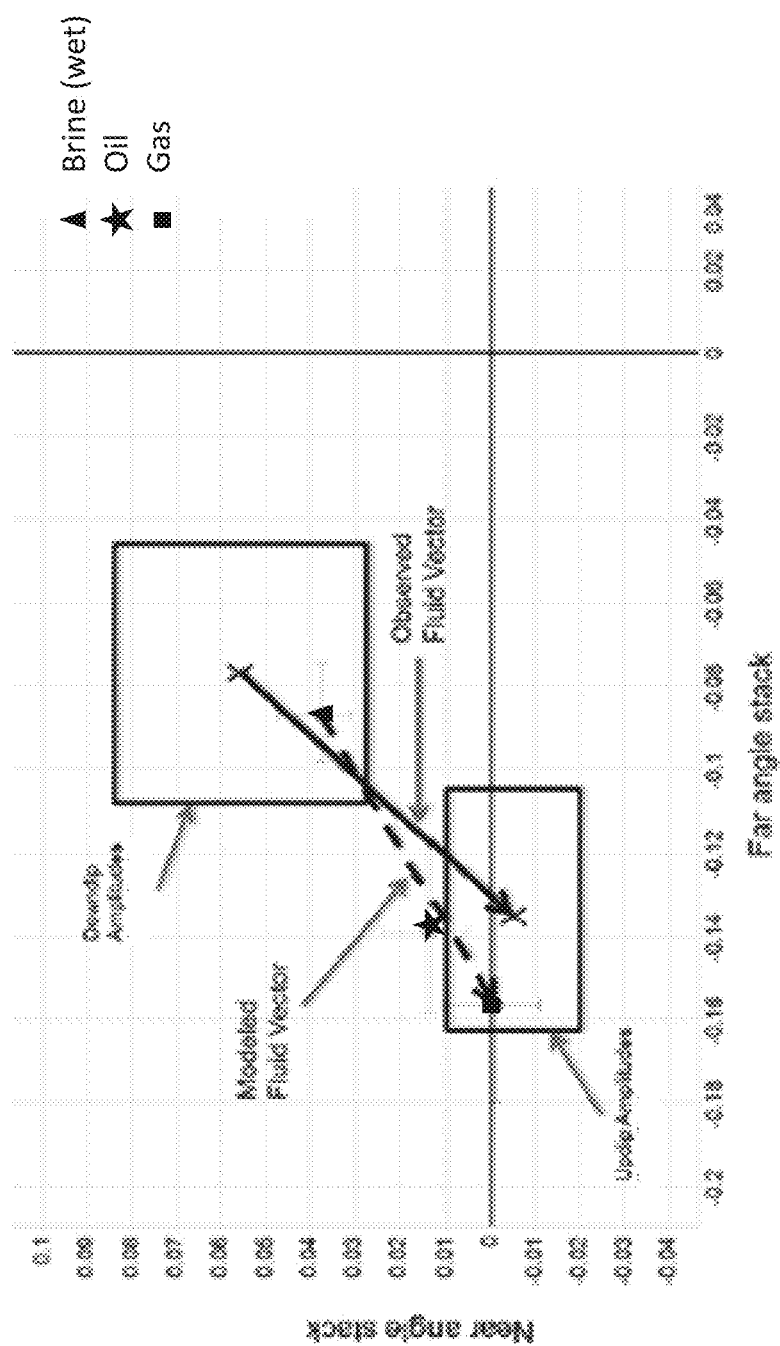
Figure 7:
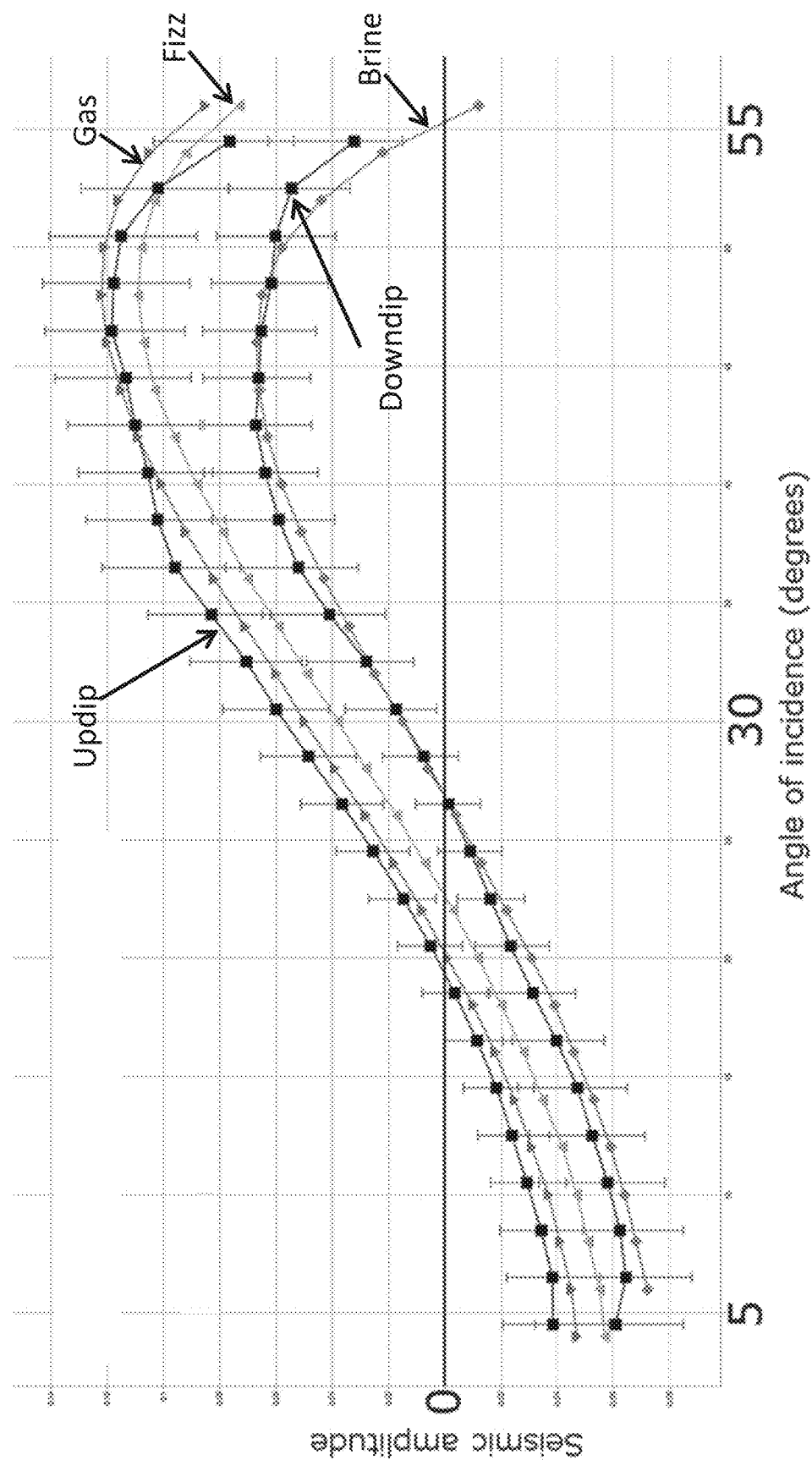

The forward modeling of operation 13 will produce modeled (i.e. synthetic) seismic gathers containing AVA effects for the various combinations of geological and geophysical parameters. Forward modeling may be done, for example, using some form of the Zoeppritz equation, full waveform modeling, or other such seismic modeling method that may be appropriate including that explained by U.S. Pat. No. 7,869,955. Then at operation 15, these synthetic seismic gathers are used to calculate the probability of various seismic amplitudes within the area of interest, thereby allowing the statistical data ranges of seismic amplitudes to be determined. For example, FIG. 4 shows AVA curves for three different fluid contents (brine/wet, fizz, and gas), including the P50 values (the triangle, star, and square symbols) with range bars indicating the P20-P80 ranges. Fizz is generally considered to be a low saturation, non-commercial amount of hydrocarbon gas in the formation water (brine/wet). The responses should be determined separately for brine, low and high hydrocarbon saturation, and different hydrocarbon fluids. The measured response ranges may also be segregated by different geological assessment of the mineralogical composition of the reservoir and non-reservoir rocks (i.e. facies) simulated in the forward modeling step. Other examples of the forward modeled responses can be seen in FIG. 5. In FIG. 5, the different grayscale dots indicate amplitudes as very-far-stack vs. near-stack for different fluid contents in different facies combinations. Boxes defining the updip amplitudes and downdip amplitudes are based on the AVA probabilities calculated in operation 14, calculated from the input digital seismic image, are shown. FIG. 6 shows a similar plot of the updip and downdip boxes but the forward modeled results have been simplified to the modeled fluid vector rather than the grayscale dots. To one skilled in the art, it would obvious that instead of defining a box around the P50 amplitudes at each measured angle to represent the range of possible models, one could also use an ellipse or other such shape to represent the spatial distribution of the data about the central value. Alternatively, a mathematical distribution characterizing the distribution of the data around the P50 amplitude could be estimated and used from operation 14 and forward in the analysis. Moreover, although FIG. 6 shows the box in two dimensions, the box (or ellipse or mathematical distribution) may be multi-dimensional. For example, if statistical data ranges are found for four different angles, the box would have four dimensions. FIG. 7 is an example of a single forward-modeled pseudowell, modeled for three different fluid contents (gas, fizz, and brine) as compared to the statistical data ranges determined from the input digital seismic image in the updip and downdip polygons.

Method 100 can now proceed to operation 16, estimating the potential pore fluid content based on comparison of the calculated AVA probabilities from operation 14 and the calculated modeled AVA probabilities from operation 15. This estimation is done by considering two different hypotheses for AVA behavior between the two different spatial areas (e.g., the updip and downdip areas). By way of example, these hypotheses may be taken as:

1. Hypothesis 1—the downdip and updip areas have the same wet sand properties so the difference in the measured seismic amplitude versus angle responses in the corresponding downdip and updip boxes are different due to a different pore fluid. This hypothesis may be implemented by either assuming that the downdip fluid is brine or that the updip box has a known hydrocarbon fluid (i.e., a well has been drilled and encountered gas or oil). This is demonstrated in FIG. 8 and FIG. 9. The downdip wet hypothesis is preferred for use in exploration, where few if any wells may exist. It may be analyzed by first determining the number of forward model responses that represent a brine-filled reservoir have responses which fit into a box centered on the P50 response at each measured parameter and an extent determined by the user-selected range. The successful models must have a calculated response which fits all of the measured response ranges. Next determine from this sub-class of forward model responses, those models which have a calculated response in the updip box centered on the P50 response at each measured parameter and an extent determined by the user-selected range. The pore fluid considered in the models which fit the updip box response may be brine, or any of the hydrocarbon fluid combinations considered in the forward modeling step. Sum the total number of forward model responses which fit both the downdip box and updip box criteria. The probability of each pore fluid in the updip box according to this hypothesis is the number of successful response for that pore fluid divided by the total number of successful responses. The known updip hydrocarbon case requires at least one well and can be used for appraisal and development of hydrocarbon fields, including estimating fluid probabilities in adjacent, undrilled fault blocks.

2. Hypothesis 2—the downdip and updip areas have different or unrelated rock properties so there is no correlation between the measured seismic amplitude versus angle responses between the downdip and updip boxes. This is demonstrated in FIG. 8 and FIG. 9. This hypothesis may be analyzed by determining the subset of modeled seismic amplitude versus angle responses that fit the updip box for each pore fluid. The box is centered on the P50 measured response at each measured parameter and an extent also calculated by the statistical data ranges, for example the P20-P80 range. The successful models must have a calculated response which fits all of the measured response ranges. The pore fluid considered in the models which fit the updip box response may be brine, or any of the hydrocarbon fluid combinations considered in the forward modeling step. Sum the total number of forward model responses which fit the updip box criteria. The probability of each pore fluid in the updip box according to this hypothesis is the number of successful response for that pore fluid divided by the total number of successful responses.

Figure 8:
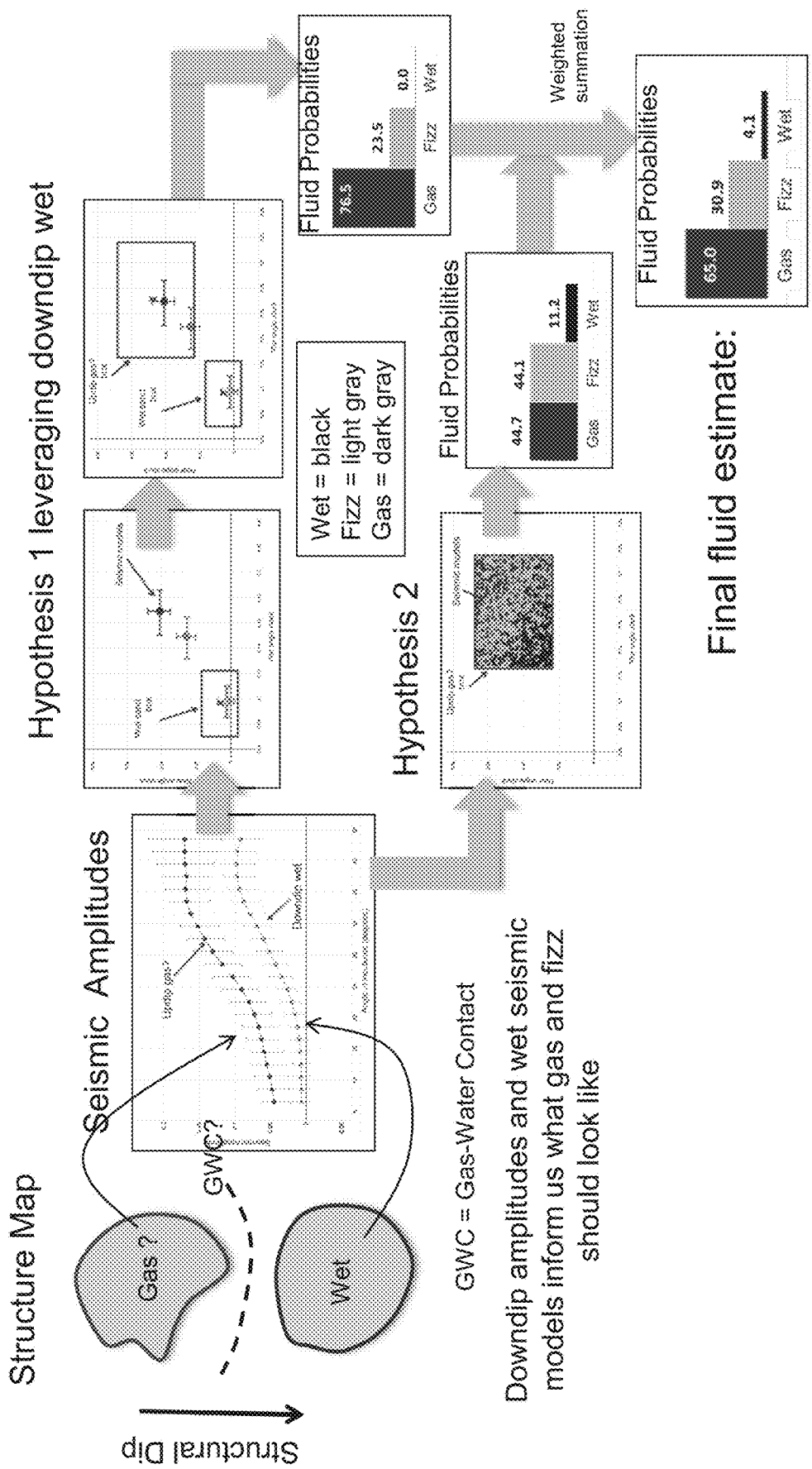
FIGS. 8-9 are examples of other steps and results from embodiments.
Figure 9:
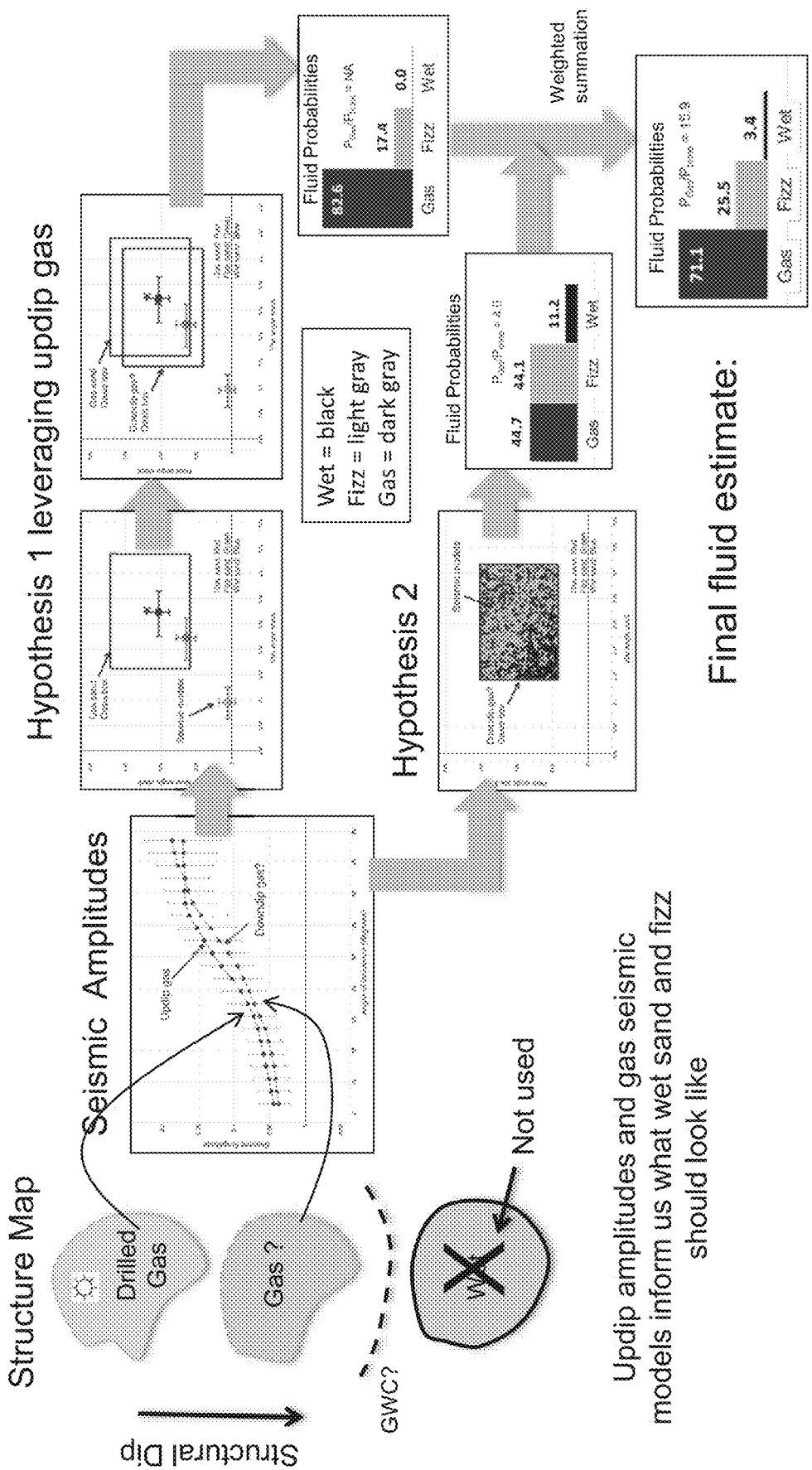
Figure 10:
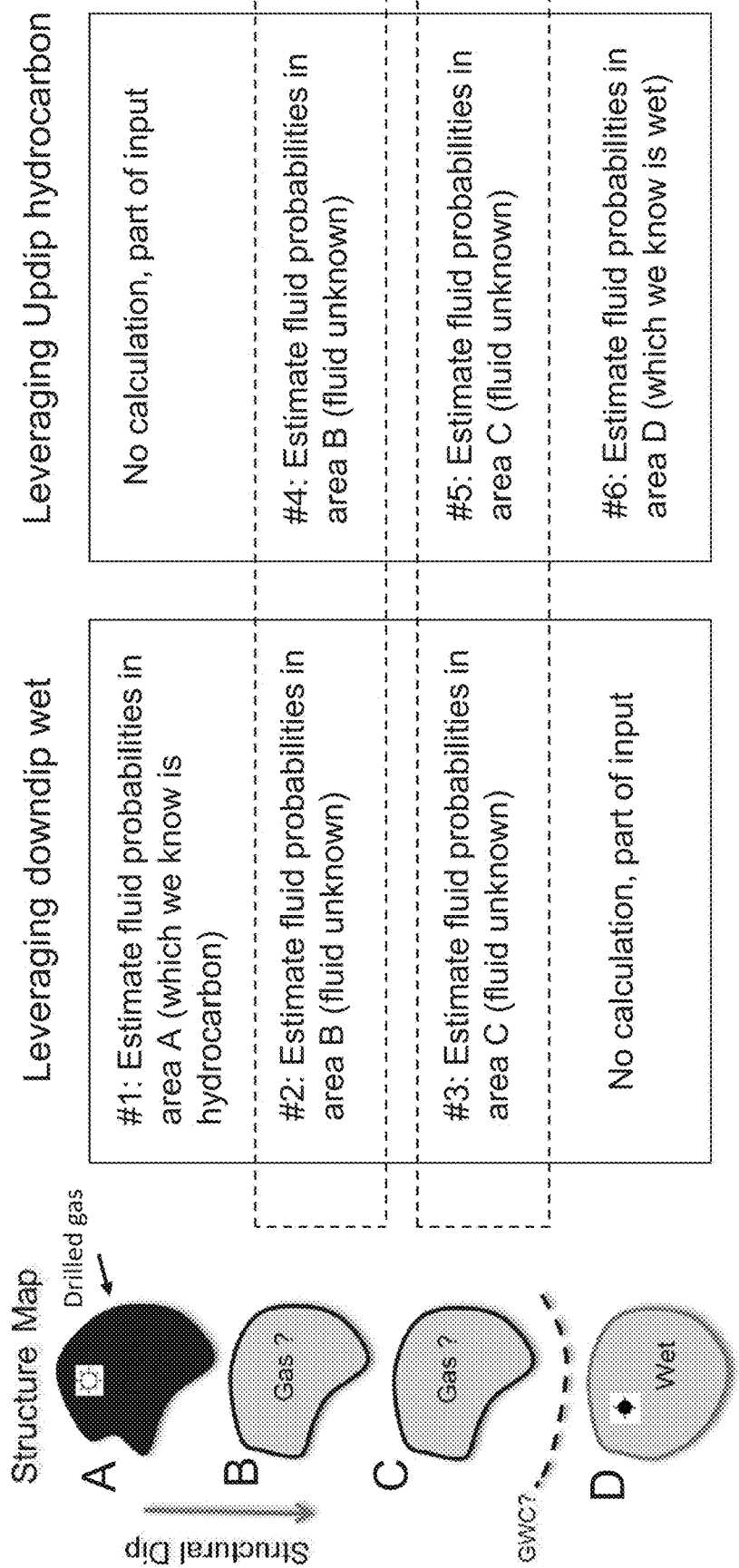
FIG. 10 summarizes two embodiments.

A summary of the assumed downdip wet case and the known updip hydrocarbon case is shown in FIG. 10. Here, there are 4 regions A-D, with A being the highest on the structure and D being the lowest on the structure. A possible gas/water contact (GWC) is indicated. For either the assumed downdip wet or the known updip hydrocarbon cases, the regions B and C have unknown fluid content and the processes described above can be used to estimate the probabilities of various fluids, as shown in FIGS. 8 and 9, respectively. In the assumed downdip wet case, region D is presumed to be wet (brine) and fluid probabilities can be calculated for region A. In the known updip hydrocarbon case, region A is known and the fluid probabilities in region D can be estimated. Those of skill in the art can also see that these methods can be modified to estimate fluid probabilities in regions updip or downdip from regions B or C, if these regions are drilled into.

The hypotheses may be combined to estimate a probability for each rock property (potential pore fluid, porosity, thickness, $V_{Shale}$, etc.) in the reservoir. When combining the two hypotheses, it is necessary to normalize the results so they can be combined in a meaningful way. There are numerous methods to execute the normalization. In one such method, the total count for Hypothesis 1 (Wet seismic models in downdip box and gas or fizz or wet models in updip box) and the total count for Hypothesis 2 (Seismic models in updip box) are normalized. After normalization, the models that fit Hypothesis 1 and the normalized number of models that fit Hypothesis 2 are added together with equal weighting or some other user-selected weighting between the hypotheses. If there exists a prior probability estimate of the pore fluid in the updip polygon, the probability of the pore fluid in the updip polygon may be updated based on the analysis above via Bayesian inference. In a different embodiment, the normalization may normalize the two hypotheses based on equal parent populations. The parent populations are the maximum possible counts. Those skilled in the art can appreciate that there may be other methods to normalize the information from Hypothesis 1 and Hypotheses 2 than may be outlined here.

Seismic models which are consistent with hypothesis 1 or hypothesis 2 can also be used to estimate rock properties. The estimated rock properties may include the estimated rock properties include at pore fluid content, porosity, brine composition, hydrocarbon composition, pressure, temperature, porosity, reservoir thickness, mineralogical composition such as $V_{Shale}$, or any combination thereof. These estimated rock properties are estimates of the average geology in the spatial area of interest. There are two specific cases of particular interest. Case 1 is the subset of seismic models consistent with hypothesis 1, wet models downdip and hydrocarbon models updip. These models represent an exploration success case and describe the sub-surface properties consistent with the seismic amplitudes from both downdip and updip areas. Rock properties such as porosity, thickness, and Vshale can be estimated from these seismic models. Statistical measurements can be computed and summarized. Case 2 is the subset of seismic models consistent with hypothesis 2, wet models downdip and wet models updip. These models represent an exploration failure case and describe the sub-surface properties consistent with the seismic amplitudes from both downdip and updip areas. For case 2, rock properties such as porosity, thickness, and Vshale can be estimated from these seismic models, but this calculation is done separately for downdip wet models and updip wet models. Statistical measurements can be computed and summarized. The difference is rock properties downdip and updip tells us the change in wet rock properties required to explain the differences in seismic amplitudes for the downdip and updip areas.

Figure 11:
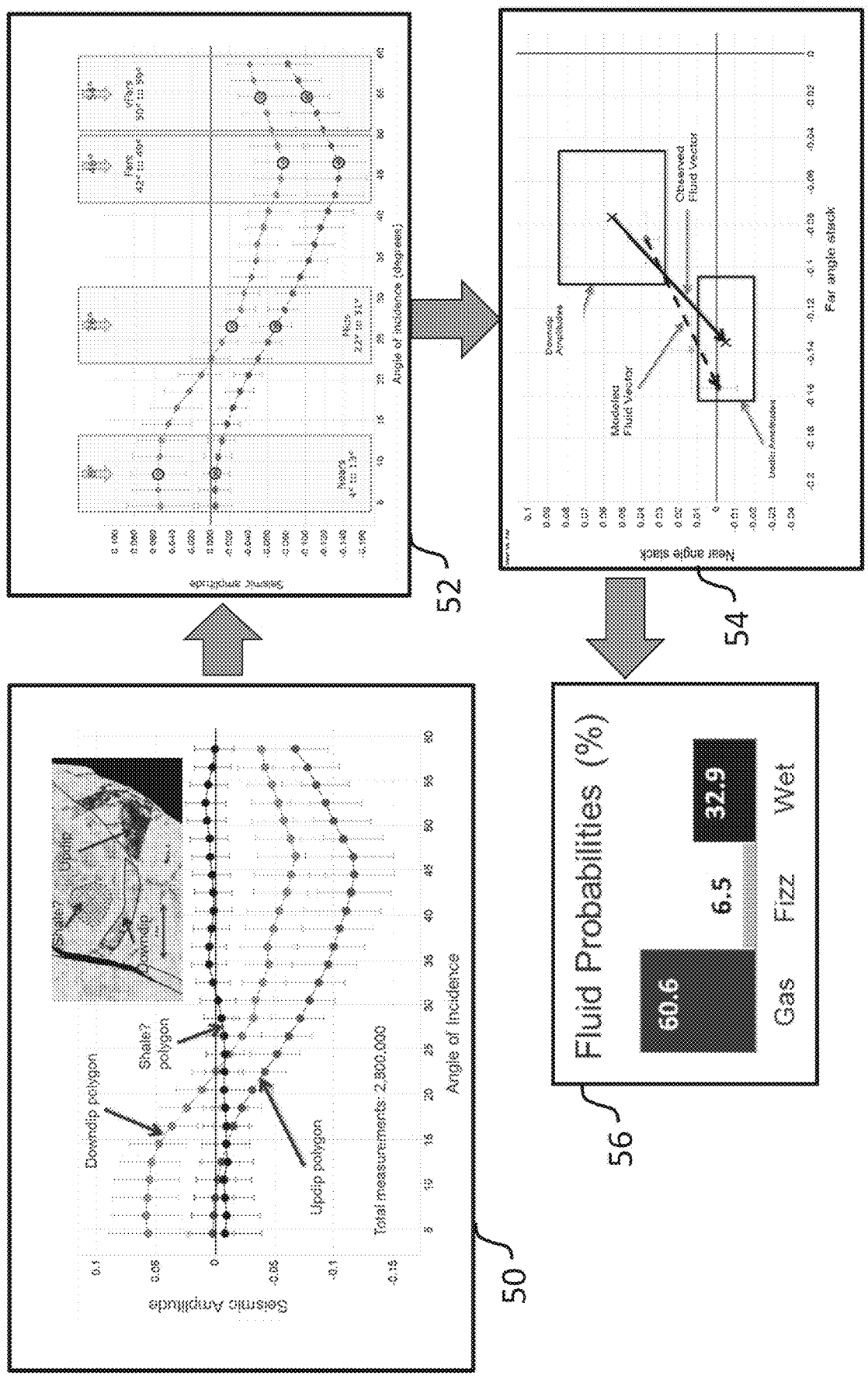
FIGS. 11-12 are examples of other steps and results from embodiments.

FIG. 11 is an example of the steps of method 100. Diagram 50 shows AVA probability curves created at operation 14 of method 100. Diagram 52 shows the AVA probability curves with angle ranges selected for use in subsequent steps of method 100. Diagram 54 demonstrates the comparison of downdip and updip boxes and the measured P50 and modeled fluid vectors which is part of operation 16 of method 100. Chart 56 shows the resulting probabilities of fluid content for this example, also part of operation 16. Although these results are displayed graphically, this is not meant to be limiting. Other methods of presenting the results, such as in a spreadsheet format, are possible.

Figure 12:
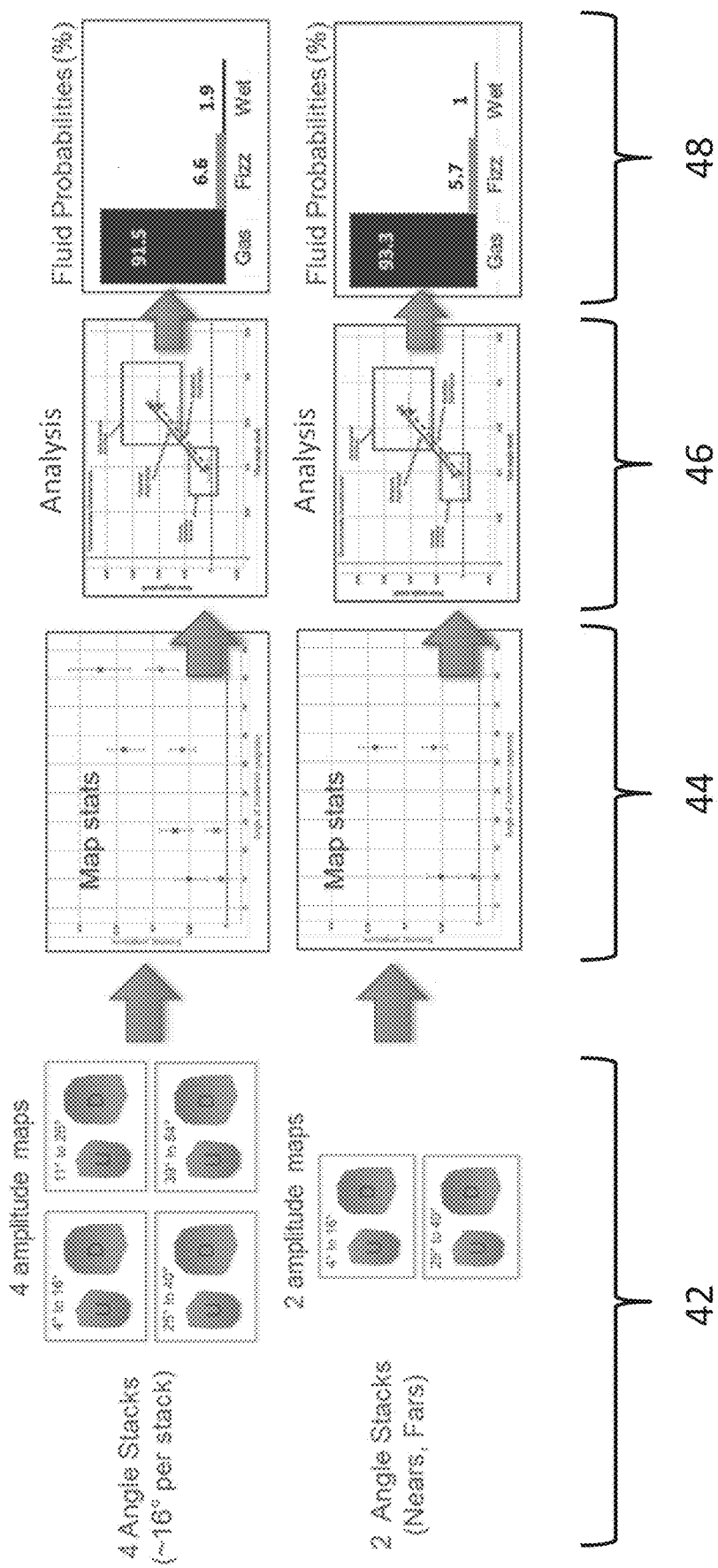

FIG. 12 illustrates one example of method 100 using 4 different input amplitude maps (top row) and one example using 2 different input amplitude maps (bottom row) as shown in column 42. For the top example, the seismic dataset was stacked over angles 4-16, 11-26, 25-40, and 39-54 degrees and the amplitude maps were each generated for the same horizon. For the bottom example, the seismic dataset was stacked over angles 4-16 and 25-40 degrees and the amplitude maps were each generated for the same horizon. These examples are not meant to be limiting. Any range of angle stacks may be created and any number of amplitude maps may be created. Column 44 shows the statistical data ranges calculated for the two examples. Column 46 shows the analysis of the AVA probabilities from the seismic image and forward modeling. Column 48 shows the estimated pore fluid content probabilities.

The method 100 of FIG. 1 presumes that the digital input image is of sufficient quality to make the AVA analysis possible. However, there are many factors that impact the quality of the digital input image, such as random noise, coherent noise, problems with the seismic survey acquisition, errors in data processing, and the like. In other cases, the fluid and lithologic properties of the subsurface may be such that even with perfect seismic data to generate a perfect digital input image there will not be sufficient differentiation between the different fluid scenarios (e.g., water vs. fizz vs. gas). Those of skill in the art are aware that high confidence amplitude anomalies, if present in seismic data, significantly reduce exploration risk. The business value of seismic data in terms of fluid estimation is how confidently we can identify the various fluids. There are three fundamental factors controlling this confidence:
1. The amplitude differences associated with reservoirs when they contain different fluids (e.g. gas, oil, wet)
2. Variability of the elastic properties of the rocks (variability related to porosity, cementation, thickness, clay content)
3. Quality of the seismic data: Ability of the seismic to accurately record changes of earth properties in the presence of noise Considering bullets 1 and 2 above, this is something that can be measured using seismic models. Large differences in rock properties related to fluids give the possibility of assessing a given seismic event as high probability gas, high probability oil or high probability wet. It is desirable to find definitive or diagnostic fluid estimates; for example where the probability of gas sand is four times the probability of a wet sand (e.g. $P_{gas}$ of 80% and $P_{wet}$ of 20%). Ambiguous results, where fluid probabilities are more or less equal, are of little or no business value. In such cases, seismic amplitudes can't be used to estimate exploration or development risk, and we must use geologic, structure and geometric observations to estimate exploration or development risk.

Figure 13:
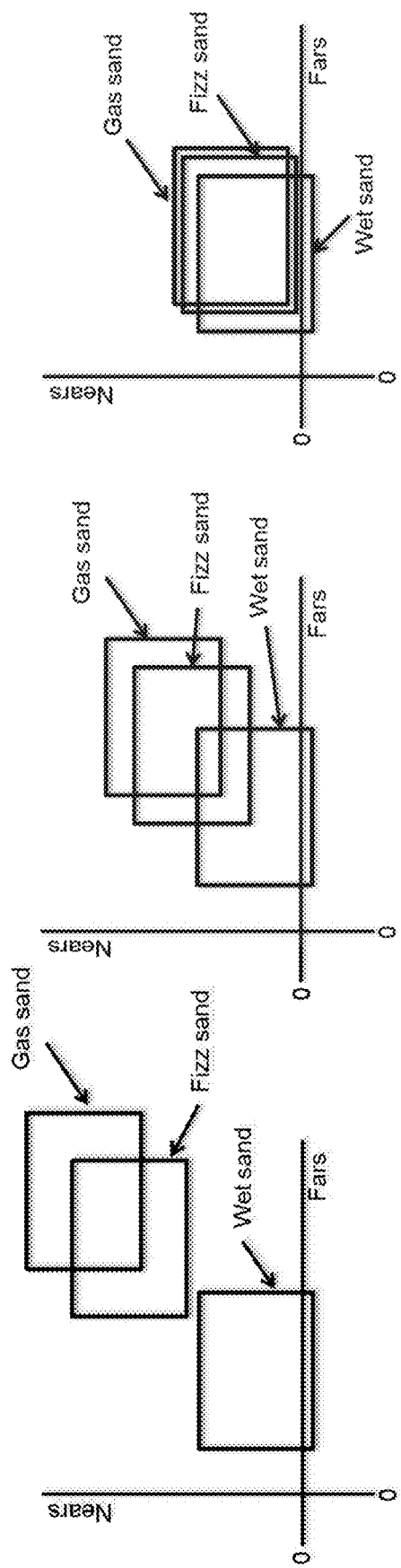
FIGS. 13-14 are examples of other steps and results from another embodiment.

The following embodiment seeks to estimate the most diagnostic fluid estimates possible given a set of rock and fluid properties using a method that is both quantitative and probabilistic. Seismic models of amplitude vs angle are generated for a seismic reflection from the top or base of a prospective hydrocarbon bearing zone or layer given a certain range of geological parameters as represented by measurements from seismic data of an area known to be or very confidently known to be non-hydrocarbon bearing. Industry standard techniques use deterministic estimation of the underlying geologic and geophysical parameters which contribute to the amplitude versus angle response utilizing forward modeling or inversion. The subsurface parameters of interest are the thickness, pore fluid (brine, oil, gas), hydrocarbon saturation, porosity, etc. A range of probabilistic seismic models are created for each fluid case of interest; gas, fizz and wet for a typical embodiment. This is done by varying the geologic and elastic properties to define a wet case set of properties. Fluid substitution (e.g. Gassmann) is used to compute the fizz and gas case. With a probabilistic range of models for three fluids we can compute an ideal (noise-free) representation of the seismic response expected from a reservoir with each of the three fluid cases (gas, fizz, wet). The intent is to determine if different pore fluids will be discernable in seismic data, allowing one of skill in the art to decide if seismic data are likely to contain reliable direct hydrocarbon indicators (DHI). A DHI is an anomalous seismic response caused by the presence of hydrocarbons. If the different pore fluids are not discernable for this perfect noise-free case (the best case seismic scenario), then using the method 100 of FIG. 1 on the real digital seismic image input is not recommended as the seismic-based results will not be capable of distinguishing one fluid from another. FIG. 13 demonstrates three possible examples. In the left-most example, seismic amplitude models representing a shallow prospect (reservoir) with large separation between sand and shale properties were generated. The gas and fizz seismic models are well separated from the wet sand case. This indicates that diagnostic fluid probabilities should be attainable for actual recorded seismic data; this means that seismic amplitudes have the potential to be a DHI. In the center example of FIG. 13, seismic models for a moderately deep prospect with somewhat similar sand and shale properties were generated. The boxes for the wet sand, fizz sand, and gas sand overlap more, but the fizz and gas sands are still largely distinguishable from the wet sand. In this scenario, excessive noise in the seismic data (random or systemic) or errors in the data processing can make it impossible to reliably separate the fluid content signatures. In this scenario, it may be possible to analyze the seismic data using method 100 of FIG. 1, but the data needs a very high level of quality processing. The righthand example of FIG. 13 is for models of a deep prospect where the sand and shale properties are very similar. The boxes for the wet sand, fizz sand, and gas sands overlap almost entirely. In this case, even with perfect seismic data it will not be possible to differentiate between the different fluid cases. This would indicate that there is no point in trying to use the method 100 of FIG. 1 for a recorded seismic dataset.

This methodology estimates how diagnostic the rock and fluid properties are in terms of modelled seismic amplitudes. If the rock and fluid properties can be diagnostic of fluid type (gas, fizz, wet), then considerable efforts can be applied to using real seismic for fluid estimation (i.e., performing method 100). The seismic model fluid estimation values from the perfect seismic case may be used as a benchmark for fluid estimation values from actual seismic. The results from this methodology are both quantitative and probabilistic. Poor comparisons between fluid estimation results from seismic models and actual seismic can suggest opportunities for seismic reprocessing and/or workflow changes.

The perfect seismic fluid estimation method utilizes seismic model data in place of real seismic amplitude measurements. The mechanics of the fluid estimation workflow are followed just as defined for the seismic amplitude as in method 100 but the seismic amplitude data has been replaced by seismic model data. Statistical measurements of the probabilistic seismic model AVA are used in place of the statistical measurements of the real seismic to perform operation 16 of method 100, estimating the potential pore fluid content. The embodiment executes the 2-hypothesis test described above with an updip and downdip box as follows: replace the downdip seismic amplitude measurements with the brine seismic modeling described in the previous paragraph. The updip seismic amplitude measurements are replaced with hydrocarbon seismic modeling. The average geologic properties are the same updip and downdip, and any differences in amplitude versus angle measurements are due to a difference in pore fluids. It is desirable to determine the number of forward seismic models of each pore fluid modeled that have responses which are located within a box centered on the P50 response for hydrocarbon fluid desired (e.g., oil or gas) at each measured parameter and an extent determined by the user-selected statistical range. The successful models must have a calculated response which fits all of the measured seismic amplitude responses and amplitude ranges. Sum the total number of forward model responses which fit both hydrocarbon fluid box criteria. The probability of each pore fluid is the number of successful response for that pore fluid divided by the total number of successful responses. The two hypotheses for AVA behavior described above may also be used in this method. The final fluid estimate, after considering the two boxes and the two hypotheses, is the best-case fluid estimate. This represents the best case fluid estimation probability (i.e., the ability to discern the pore fluid for a given selected area on the seismic data assuming consistent geologic parameters and no seismic noise either random or coherent).

Figure 14:
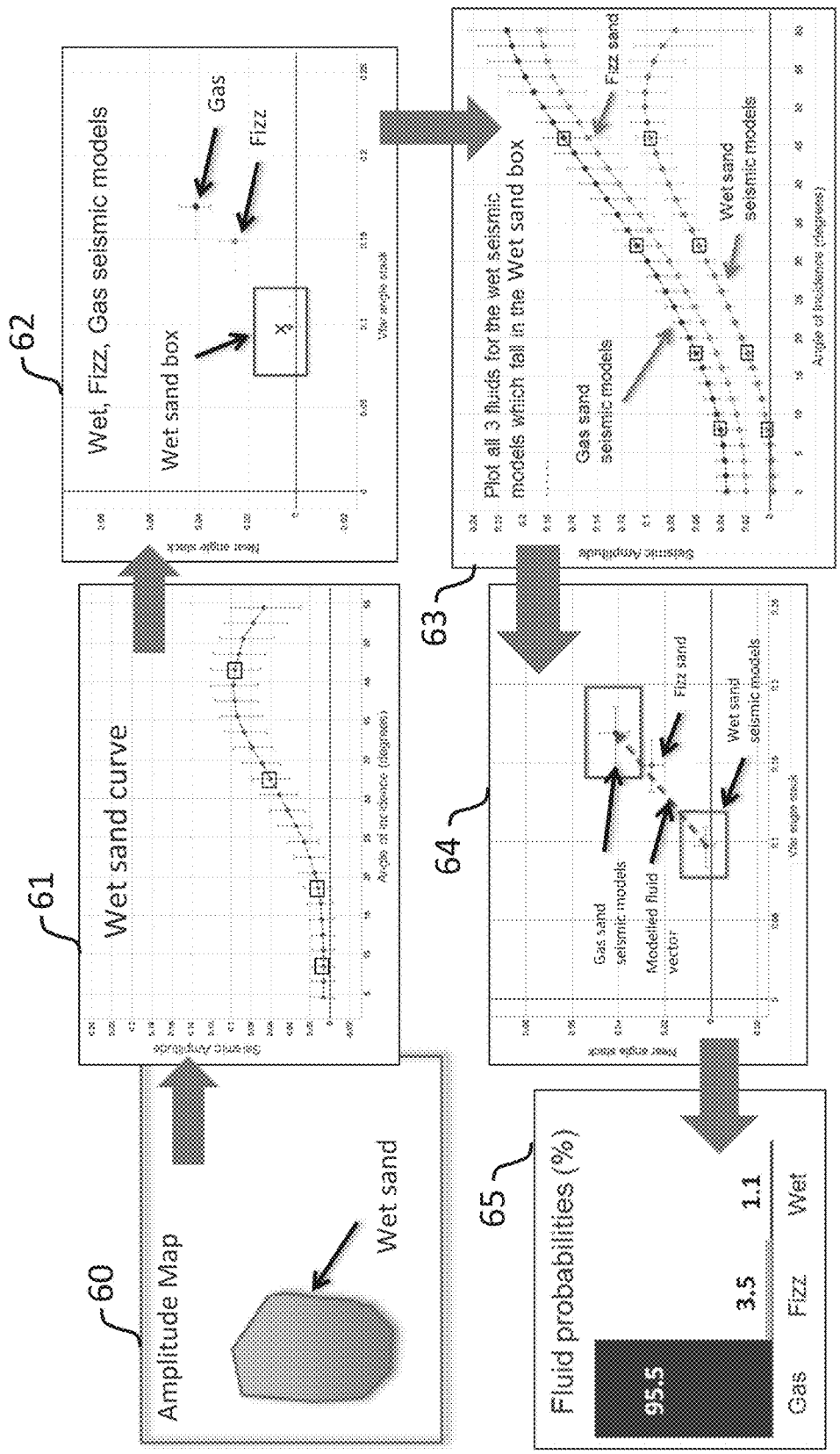

The perfect seismic fluid estimation follows method 100 of FIG. 1 with some modifications, as shown in FIGS. 13-14. In one embodiment, the spatial area of interest used in operation 12 is believed to be representative of a brine-filled reservoir formation. The statistical data ranges are calculated for the brine-filled reservoir. All of the results generated by forward modeling (operation 13 of method 100) are considered and a subset of models is selected wherein the AVA responses fall within the AVA probabilities based on the seismic image calculated at operation 14 of method 100 for the brine-filled reservoir. For the subset of models selected, this embodiment proceeds to calculate via forward-modeling the selected seismic amplitude versus angle measurements for hydrocarbon fluids (oil and gas) at the appropriate reservoir temperature and pressure, and fluid composition and saturation. FIG. 14 demonstrates the steps of the modified workflow for the perfect seismic embodiment. In this example, an amplitude map 60 of actual recorded seismic data is used as conditioning data to generate a wet sand curve 61. The use of conditioning data is an optional step. In an embodiment, the optional conditioning data may come from recorded seismic data that can be used to restrict (take a subset) of the available seismic models. The perfect seismic embodiment may begin from a very broad set of rock properties to generate the seismic model data, and the related seismic models would then also be expected to be broad in terms of coverage of the seismic amplitude space. Wet seismic amplitudes from the conditioning data can be used to select a portion of the wet seismic models. Then that subset of wet seismic models and their related fluid substituted models (meaning all 3 fluids) are taken into the 2-box test and 2 hypothesis workflow. In plot 62, the representations of the models generated for the wet sand, fizz sand, and gas sand are shown. Plot 63 shows the AVA curves for each of the saturation cases. Plot 64 shows the analysis of the 2-hypothesis test and plot 65 shows the estimated quantitative fluid probabilities for this perfect seismic embodiment. This result indicates that for the subsurface volume of interest, AVA analysis such as method 100 of FIG. 1 should be reliable and provide useful results. The reliability of AVA analysis can lead directly to decisions on whether and where to drill wells into the subterranean reservoir.

Although the previous embodiment shows the analysis starting from the wet sand properties, it should be apparent to one of skill in the art that the method could also start from a reservoir containing hydrocarbons (oil or gas) and estimate the wet sand probabilities. Additionally, optional conditioning data used in FIG. 14 is for the wet sand case, one of skill in the art will recognize that the method can condition the data by other means. The conditioning data could be based on the gas case if, for example, a gas zone had been drilled but there is perhaps no known wet zone. In another embodiment, the method may be conditioned using some statistical range about the modelled median amplitudes. For this embodiment, this statistical range might be thought of as geologic variability. The statistical range might come from recorded seismic data, in a sense using the range from the seismic but the median from the model data. This might be an important distinction when dealing with very noisy seismic (or seismic with non-flat gathers) where the median value might be uncertain. One of skill in the art could imagine other ways to come up with a statistical range that could be imposed in order to select a subset of the seismic models.

The embodiments above allow the user to determine if hydrocarbons contained in the formation of interest can be differentiated from brine based on seismic data. If yes, then seismic amplitudes are potentially of very high value and considerable work can be done to try to estimate fluid probabilities from seismic. If no, then other means of risking prospects should be used since fluids can't be reliably distinguished. The workflow is also a good consistency check. Sometimes poor prospects are presented as non-amplitude prospects even when seismic modeling says there should be amplitudes if hydrocarbons are present. The absolute worst prospects have no observed amplitude anomalies when the perfect seismic workflow shows that the rock properties say there should be an observed anomaly if hydrocarbons are present.

Figure 15:
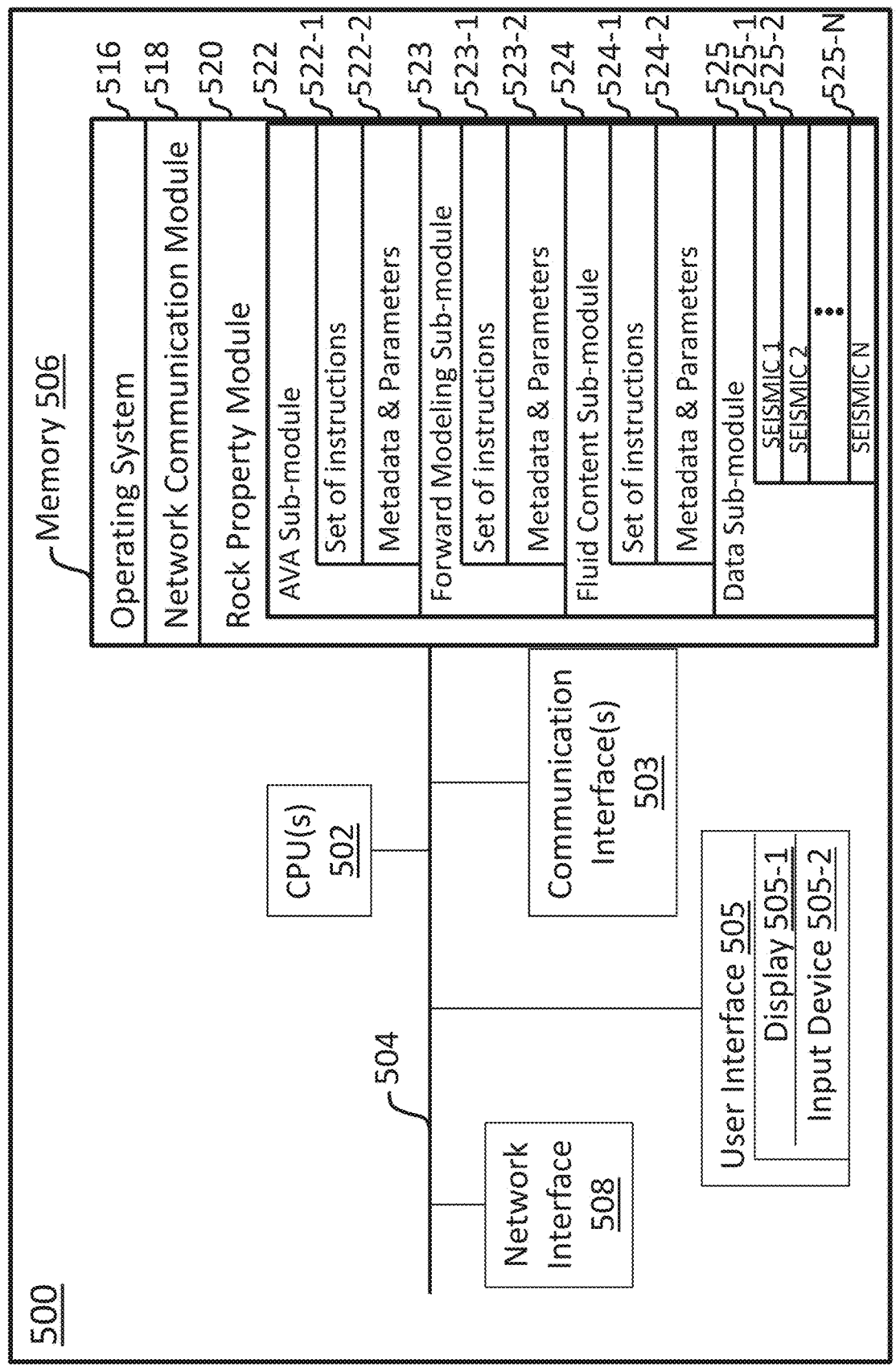
FIG. 15 is a block diagram illustrating a fluid assessment system, in accordance with some embodiments.

FIG. 15 is a block diagram illustrating a fluid assessment system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the rock property assessment system 500 includes one or more processing units (CPUs) 502, one or more network interfaces 508 and/or other communications interfaces 503, memory 506, and one or more communication buses 504 for interconnecting these and various other components. The rock property assessment system 500 also includes a user interface 505 (e.g., a display 505-1 and an input device 505-2). The communication buses 504 may include circuitry (sometimes called a chipset) that interconnects and controls communications between system components. Memory 506 includes high-speed random-access memory, such as DRAM, SRAM, DDR RAM or other random access solid state memory devices; and may include non-volatile memory, such as one or more magnetic disk storage devices, optical disk storage devices, flash memory devices, or other non-volatile solid-state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a rock property module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the fluid assessment module 520 executes the operations of method 100. Rock property module 520 may include data sub-module 525, which handles the seismic image including seismic gathers 525-1 through 525-N. This seismic data is supplied by data sub-module 525 to other sub-modules.

AVA (amplitude versus angle) sub-module 522 contains a set of instructions 522-1 and accepts metadata and parameters 522-2 that will enable it to execute operation 12, 14, and 15 of method 100. The forward modeling function sub-module 523 contains a set of instructions 523-1 and accepts metadata and parameters 523-2 that will enable it to execute operation 13 of method 100. The fluid content sub-module 524 contains a set of instructions 524-1 and accepts metadata and parameters 524-2 that will enable it to execute at least operation 16 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 15) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for determining a quantitative perfect seismic input fluid estimation for a subterranean reservoir, comprising:
   a. receiving, at a computer processor, a range of geological and geophysical parameters possible in a subsurface volume of interest;
   b. forward modeling, via the computer processor, all combinations of the geological and geophysical parameters assuming a brine saturation to generate a set of synthetic seismic brine AVA responses;
   c. performing, via the computer processor, forward modeling of the combinations of geological and geophysical parameters wherein the forward modeling uses hydrocarbon saturation rather than brine;
   d. determining, via the computer processor, a quantitative perfect seismic fluid estimation probability based on the forward modeling of steps b & c; and
   e. based on the quantitative perfect seismic fluid estimation probability, making decisions about actual recorded seismic data representative of the subsurface volume of interest, wherein the decisions may be one or more of reprocessing the actual recorded seismic data, using the actual recorded seismic data to determine fluid content probabilities, not performing an estimation of fluid content probabilities from the actual recorded data, or making decisions about drilling priority in the subterranean reservoir.

2. The method of claim 1 wherein the determining the quantitative perfect seismic fluid estimation probability represents an ability to discern a type of pore fluid in the subsurface volume of interest.

3. The method of claim 1 further comprising receiving a digital seismic image representative of a subsurface volume of interest and identifying at least one spatial area of interest representative of a wet sand for use as conditioning data for the forward modeling.

4. The method of claim 1 further comprising receiving a digital seismic image representative of a subsurface volume of interest and identifying at least one spatial area of interest representative of a hydrocarbon sand for use as conditioning data for the forward modeling.

5. A computer system, comprising:
   one or more processors;
   memory; and
   one or more programs, wherein the one or more programs are stored in the memory and configured to be executed by the one or more processors, the one or more programs including instructions that when executed by the one or more processors cause the device to:
      receive, at the one or more computer processors, a range of geological and geophysical parameters possible in the subsurface volume of interest;
      forward model, via the one or more computer processors, all combinations of the geological and geophysical parameters assuming a brine saturation to generate a set of synthetic seismic brine AVA responses;
      perform, via the one or more computer processors, forward modeling of the combinations of geological and geophysical parameters wherein the forward modeling uses hydrocarbon saturation rather than brine; and
      determine, via the one or more computer processors, a quantitative perfect seismic fluid estimation probability based on the forward modeling.

6. A non-transitory computer readable storage medium storing one or more programs, the one or more programs comprising instructions, which when executed by an electronic device with one or more processors and memory, cause the device to:
   receive, at the one or more computer processors, a range of geological and geophysical parameters possible in the subsurface volume of interest;
   forward model, via the one or more computer processors, all combinations of the geological and geophysical parameters assuming a brine saturation to generate a set of synthetic seismic brine AVA responses;
   perform, via the one or more computer processors, forward modeling of the combinations of geological and geophysical parameters wherein the forward modeling uses hydrocarbon saturation rather than brine; and
   determine, via the one or more computer processors, a quantitative perfect seismic fluid estimation probability based on the forward modeling.

* * * * *